(12) United States Patent
Chambe et al.

(10) Patent No.: US 9,866,167 B2
(45) Date of Patent: Jan. 9, 2018

(54) MODULAR SOLAR MOBILE GENERATOR

(71) Applicants: Eric Chambe, Lyons (FR); Gilles Essertel, St Genis l'Argentière (FR); Lionel Guyot, Marseilles (FR); Maurice Kahn, Marseilles (FR)

(72) Inventors: Eric Chambe, Lyons (FR); Gilles Essertel, St Genis l'Argentière (FR); Lionel Guyot, Marseilles (FR); Maurice Kahn, Marseilles (FR)

(*) Notice: Subject to any disclaimer, the term of this patent is extended or adjusted under 35 U.S.C. 154(b) by 191 days.

(21) Appl. No.: 14/654,801

(22) PCT Filed: Dec. 20, 2013

(86) PCT No.: PCT/IB2013/002854
§ 371 (c)(1),
(2) Date: Jun. 22, 2015

(87) PCT Pub. No.: WO2014/096945
PCT Pub. Date: Jun. 26, 2014

(65) Prior Publication Data
US 2015/0349699 A1 Dec. 3, 2015

(30) Foreign Application Priority Data
Dec. 20, 2012 (CA) ................................. 2800039

(51) Int. Cl.
*H01L 31/042* (2014.01)
*H02S 10/40* (2014.01)
(Continued)

(52) U.S. Cl.
CPC ............ *H02S 10/40* (2014.12); *F24J 2/5431* (2013.01); *H02S 10/20* (2014.12); *H02S 20/30* (2014.12);
(Continued)

(58) Field of Classification Search
USPC ........................................................ 136/245
See application file for complete search history.

(56) References Cited

U.S. PATENT DOCUMENTS 4,315,163 A   2/1982   Bienville
4,481,562 A   11/1984  Hickson
(Continued)

FOREIGN PATENT DOCUMENTS

DE       3048550        7/1982
EP       1601022 A1    11/2005
WO    2011128463 A1    10/2011

OTHER PUBLICATIONS

Written Opinion of the International Search Authority and International Search Report Application No. PCT/IB2013/002854 Completed: Aug. 6, 2014; dated Aug. 22, 2014 11 pages.

*Primary Examiner* — Jayne Mershon
(74) *Attorney, Agent, or Firm* — St. Onge Steward Johnston & Reens LLC

(57) ABSTRACT

A mobile solar generator for autonomous and continuous supply of electricity in a transportable automatically or semi-automatically unfolding/folding system. The mobile solar generator generally includes photovoltaic modules, energy storage (lithium ion batteries), power converters, and a mechanical system to fold/unfold the photovoltaic modules. The mobile solar generator may also optionally include a detachable trailer. The mobile solar generator typically has the ability to provide alternating current at a voltage of 120 or 230V single-phase or three-phase 400 V/460V 50 or 60 HZ. Electricity is generally provided by 12, 16 or 24 photovoltaic modules 347 W depending on the version of the product is typically a photovoltaic power 4, 5, or 8 KWp. The mobile solar generator can preferably be folded on itself
(Continued)

for shipping purposes. The SMG can also include skids for water treatment or other skids which use the power generated by the SMG.

20 Claims, 13 Drawing Sheets

(51) Int. Cl.
    *H02S 20/30*     (2014.01)
    *H02S 30/20*     (2014.01)
    *H02S 10/20*     (2014.01)
    *F24J 2/54*     (2006.01)
    *F24J 2/52*     (2006.01)

(52) U.S. Cl.
    CPC ....... H02S 30/20 (2014.12); *F24J 2002/5277* (2013.01); *F24J 2002/5486* (2013.01); *F24J 2002/5489* (2013.01); *Y02E 10/47* (2013.01)

(56) References Cited

U.S. PATENT DOCUMENTS

| | | | |
|---|---|---|---|
| 4,786,851 A | 11/1988 | Fuji et al. | |
| 5,111,127 A | 5/1992 | Johnson | |
| 5,522,943 A * | 6/1996 | Spencer | H01L 31/042 136/245 |
| 5,969,501 A | 10/1999 | Glidden et al. | |
| 6,201,181 B1 | 3/2001 | Azzam et al. | |
| 6,396,239 B1 * | 5/2002 | Benn | F24J 2/36 307/150 |
| 7,230,819 B2 | 6/2007 | Muchow et al. | |
| 2006/0137348 A1 | 6/2006 | Pas | |
| 2011/0259393 A1 | 10/2011 | Lai et al. | |

* cited by examiner

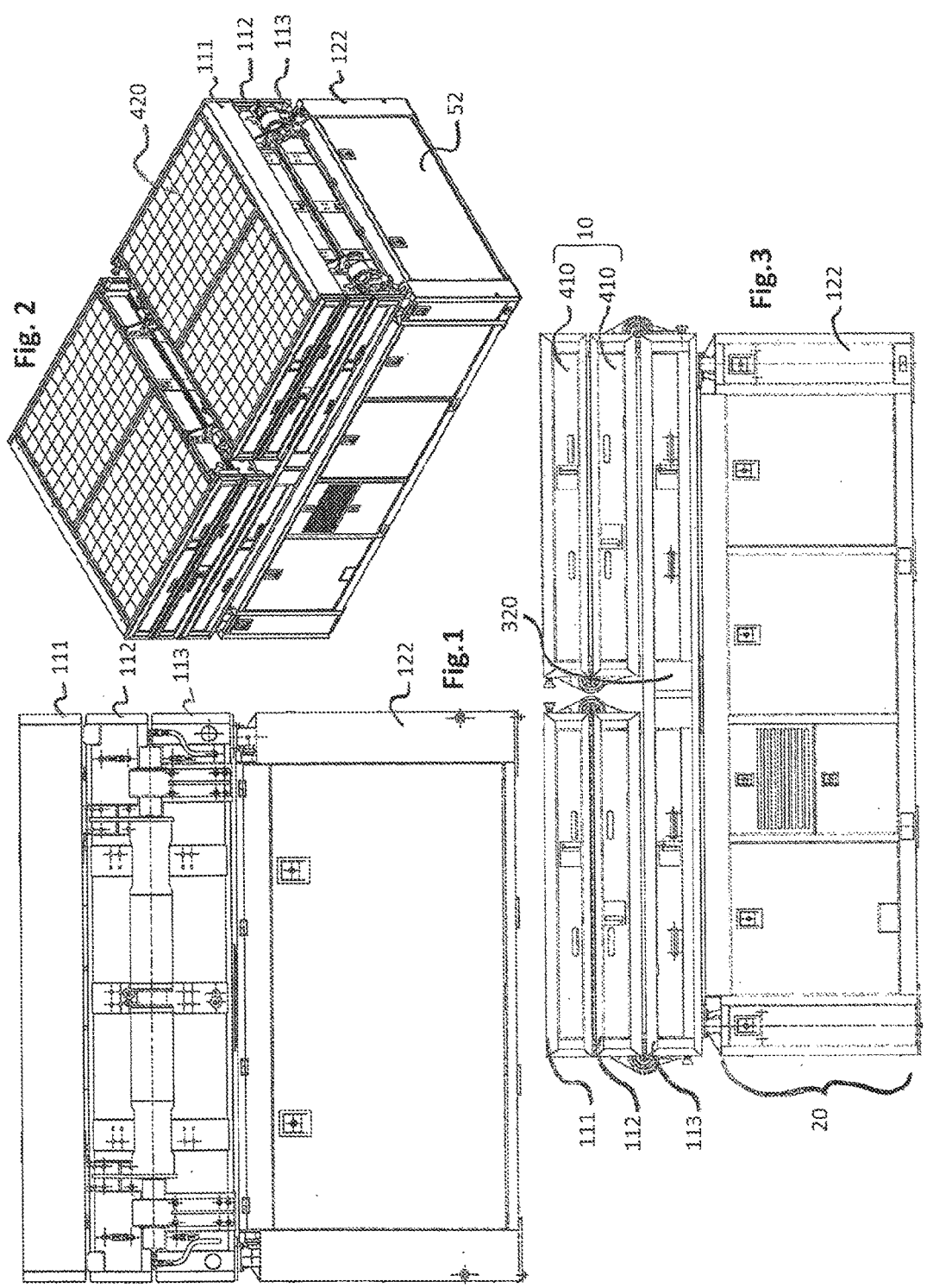

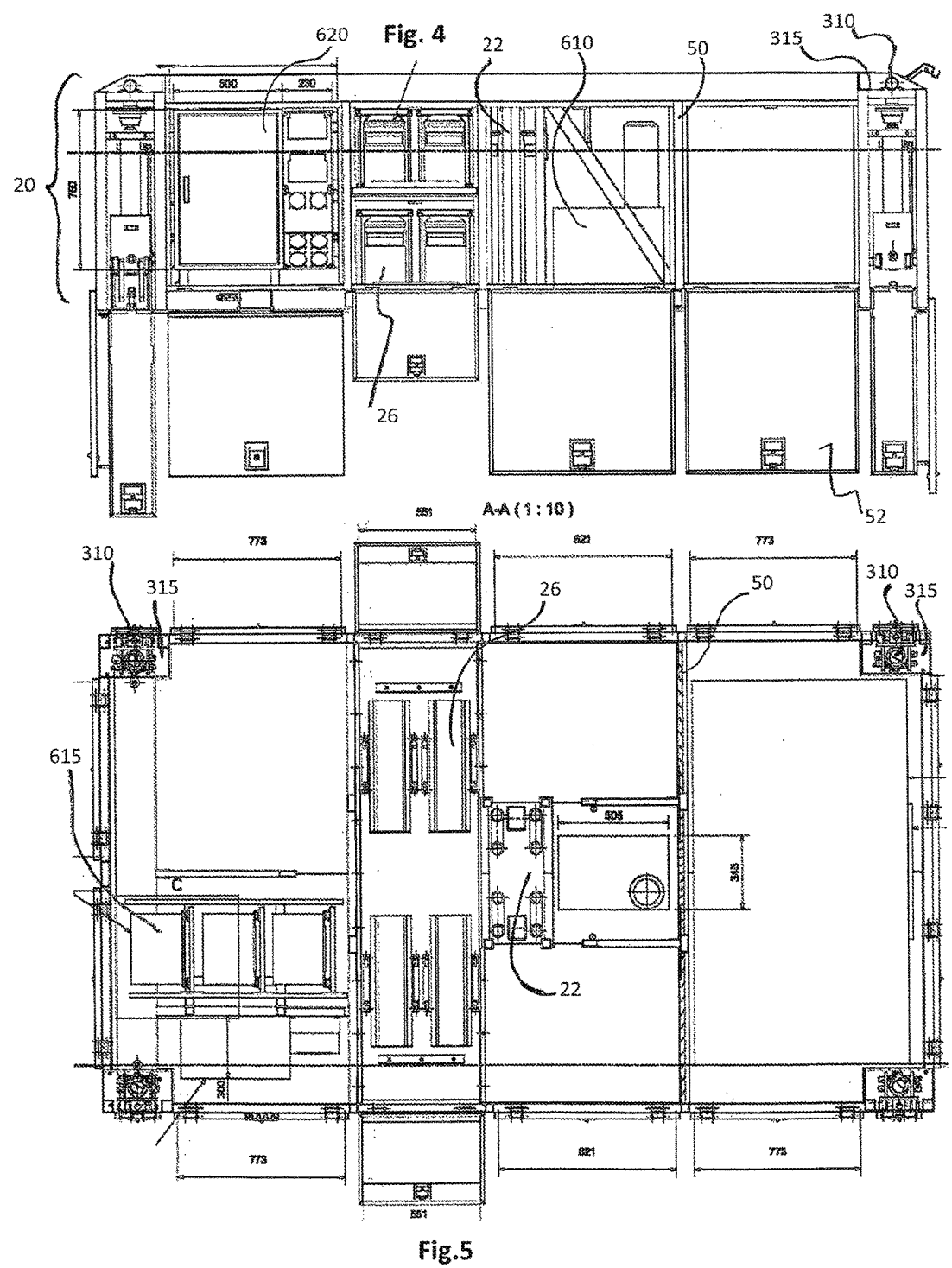

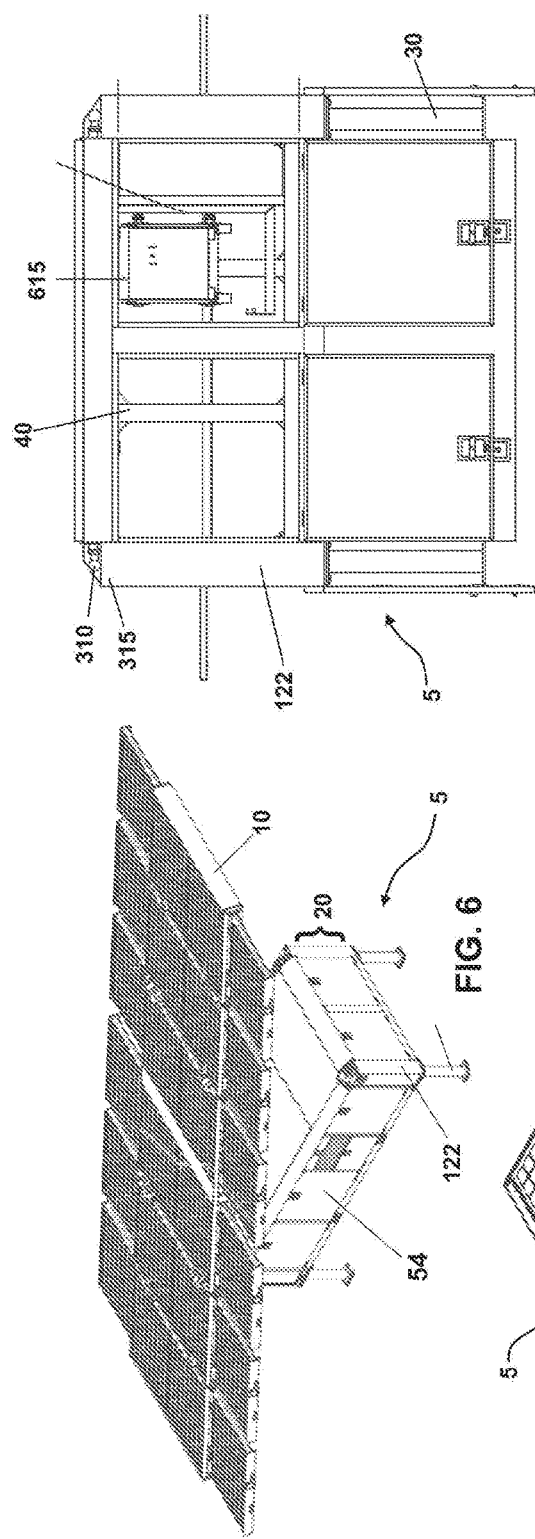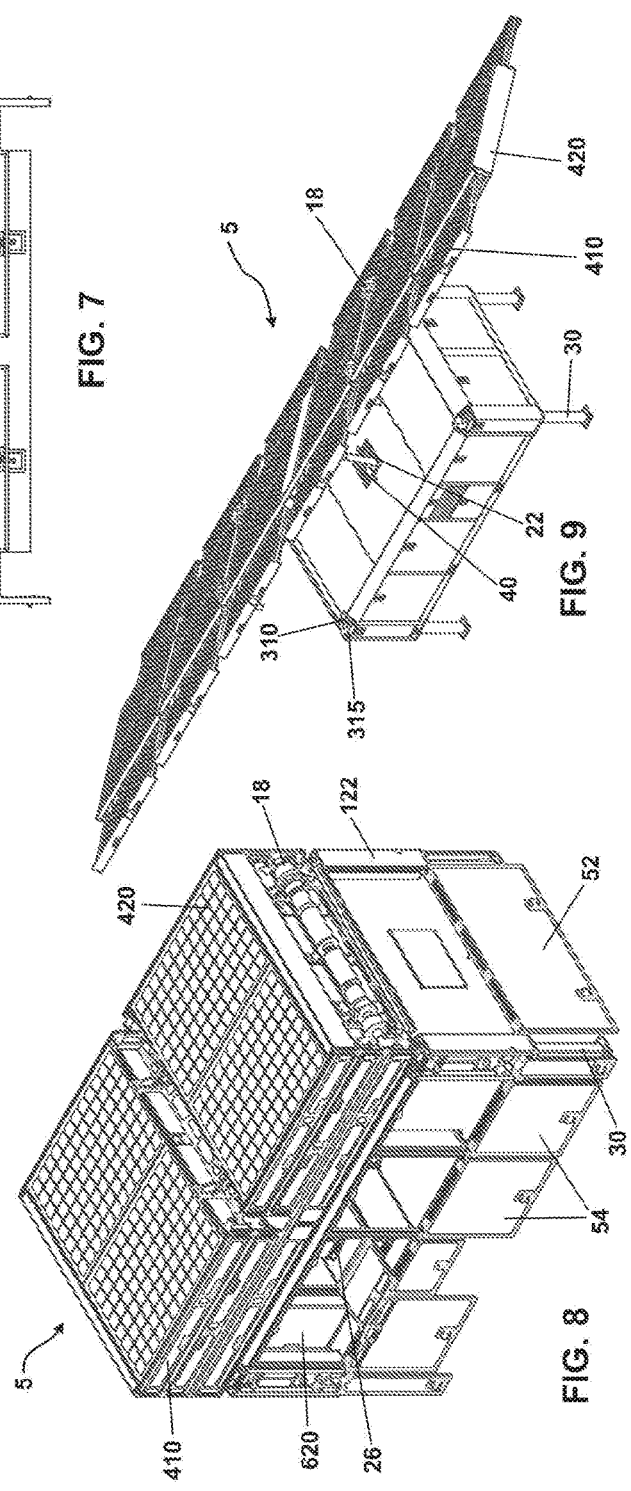

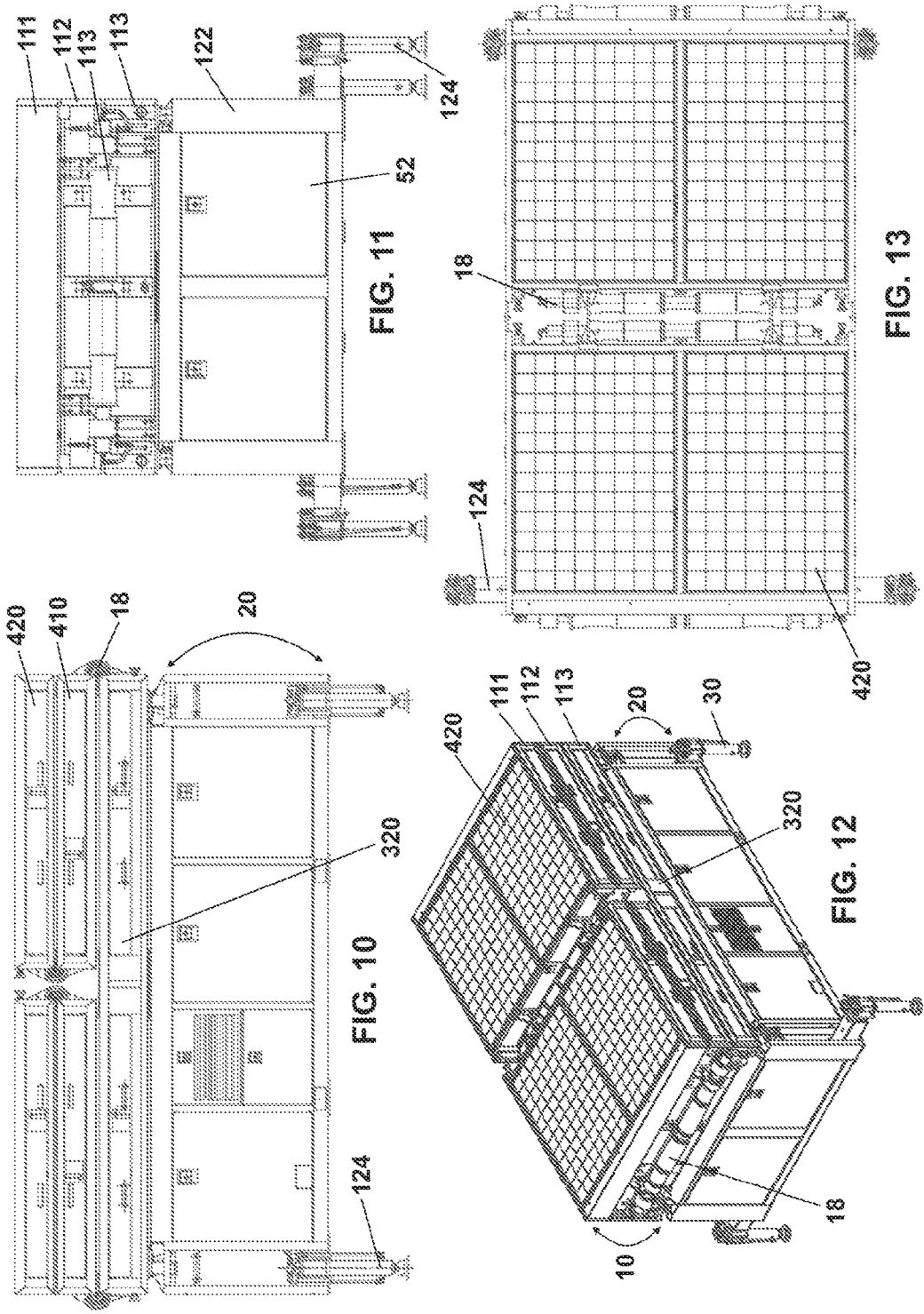

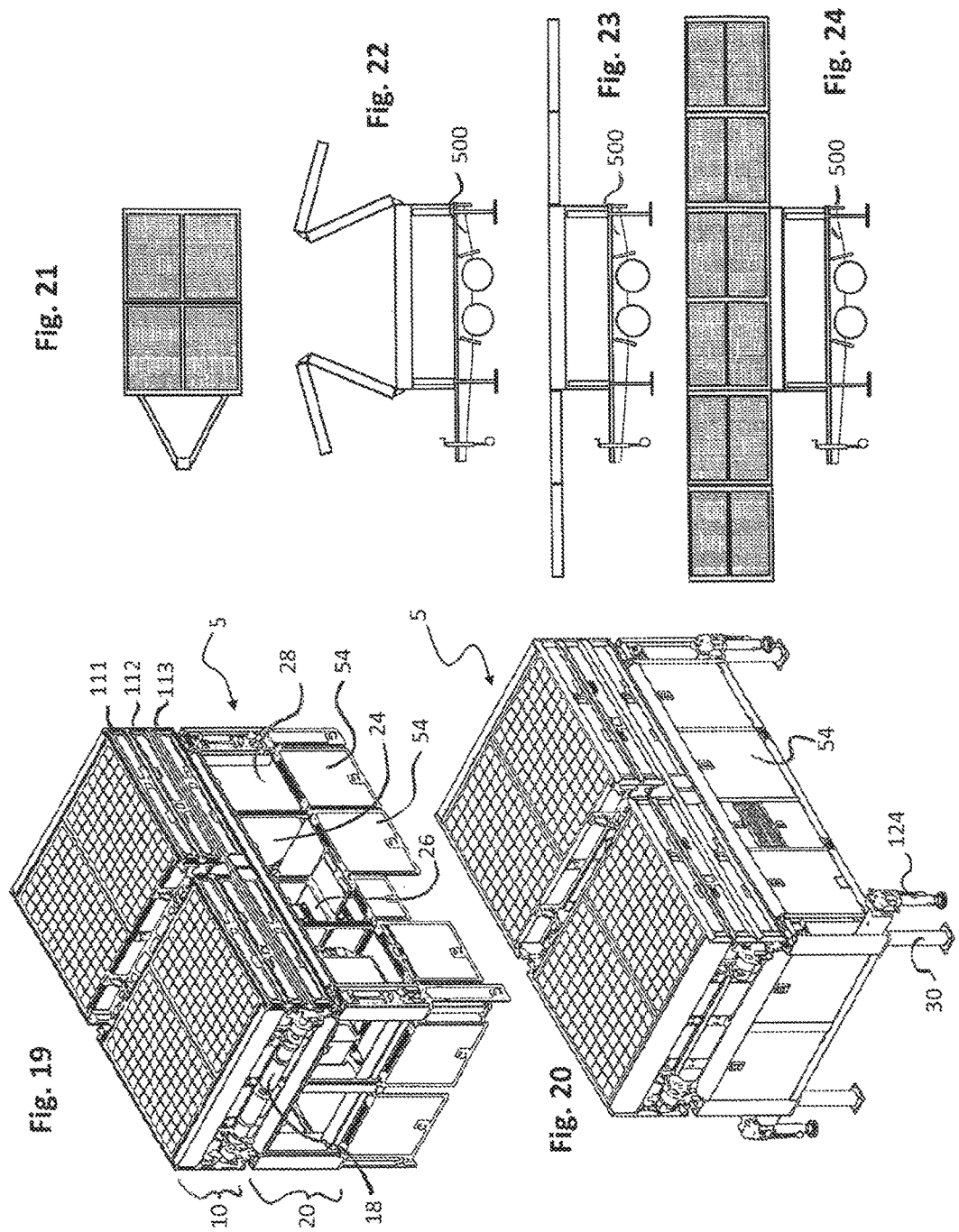

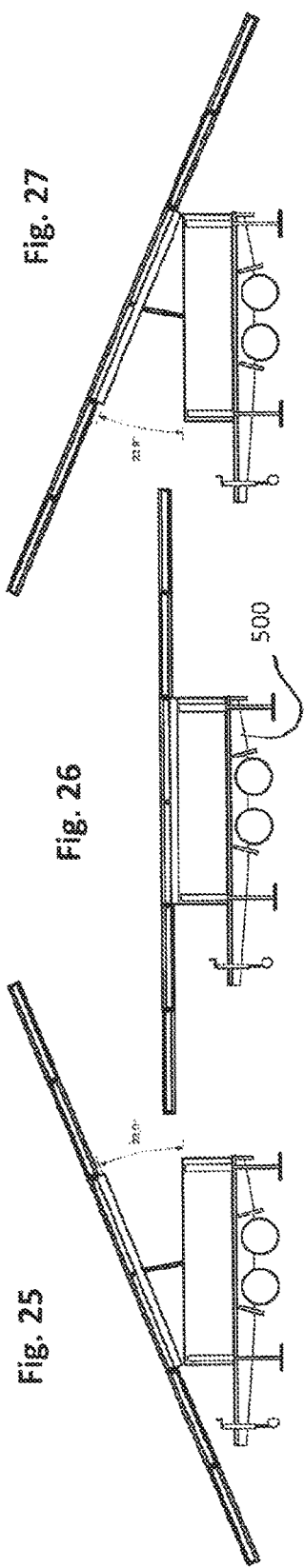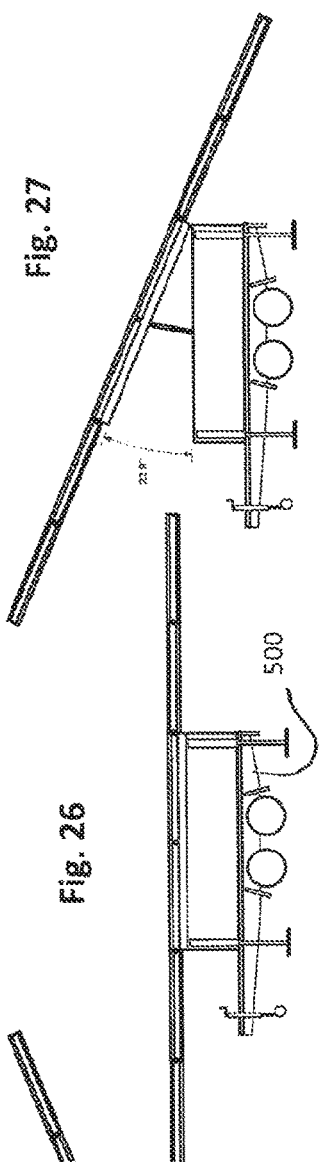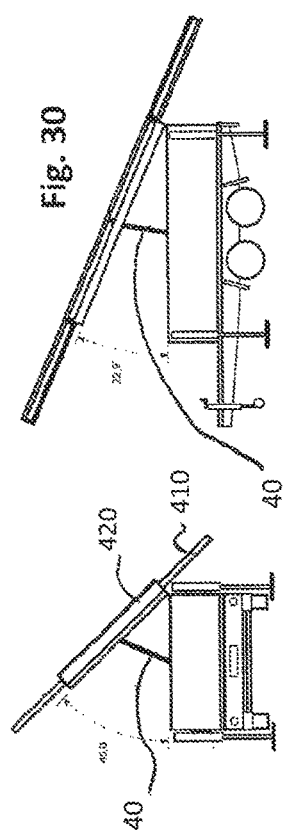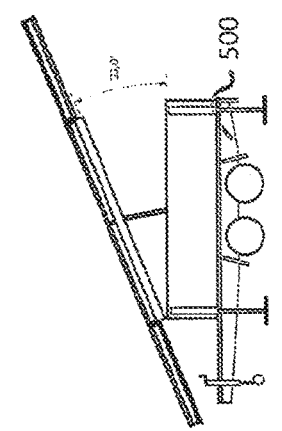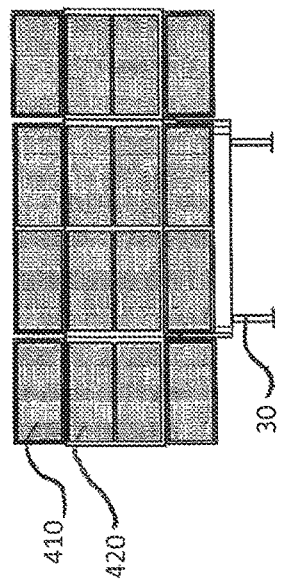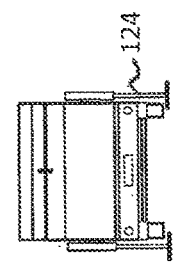

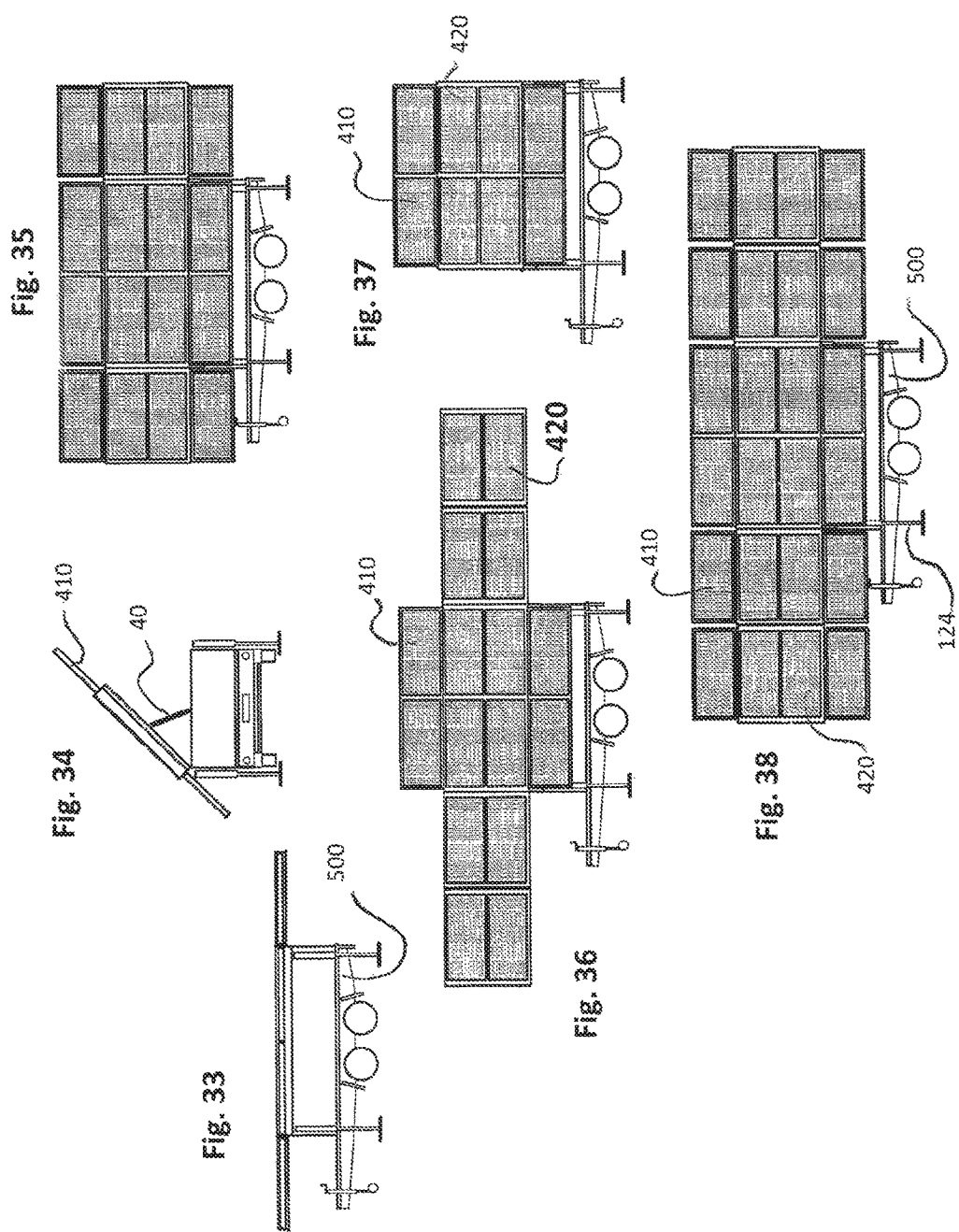

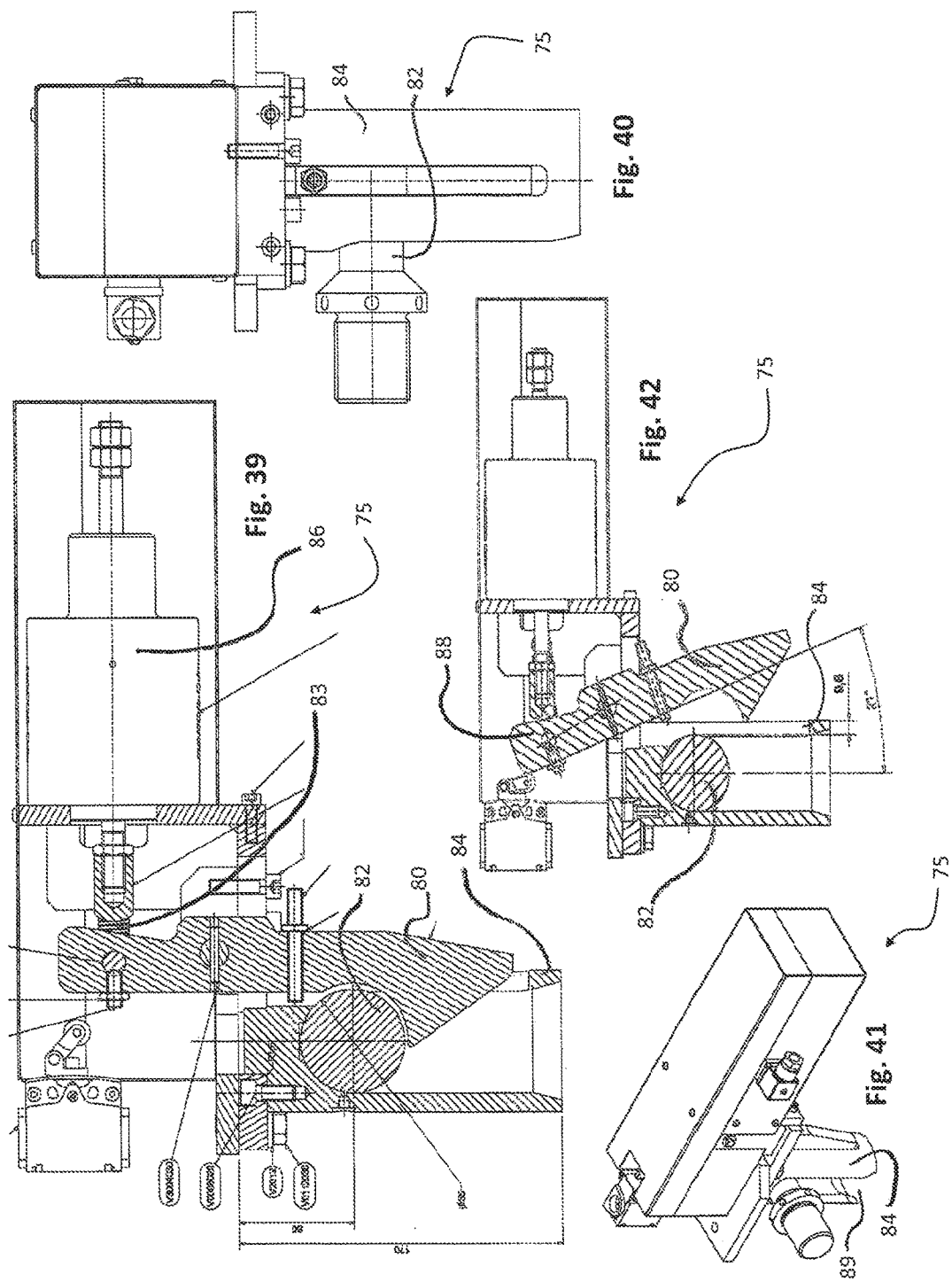

MODULAR SOLAR MOBILE GENERATOR

CROSS-REFERENCE TO RELATED APPLICATIONS

The present patent application claims the benefits of priority of commonly assigned Canadian Patent Application No. 2,800,039, entitled "GROUPE ELECTROGENE SOLAIRE MOBILE" and filed at the Canadian Intellectual Property Office on Dec. 20, 2012.

FIELD OF THE INVENTION

The present invention generally relates to mobile solar generation systems and devices.

BACKGROUND OF THE INVENTION

Even to this day, billions of people on Earth live without easy access to electricity. As electricity is known to be a major enabler of economic development of territories, emphasis must be placed on improving the access to electricity. Furthermore, several territories require electricity in remote locations hardly reachable with normal power grids. Nowadays, in such areas, energy is mostly produced with fossil combustible such as petrol, oil, coal and gas.

Efforts have been made to design devices that use solar panels for the generation of power from solar panels. For example, U.S. Pat. No. 7,230,819 describes a small deployment system made of a 'hard drive'-like compartment that is used to store energy produced by one or two panels using mechanical fans. U.S. Patent Application Publication No. 2006/0137348 describes an energy station which includes solar panels fixed onto a huge container truck that also has wind turbines and battery storage, hydrogen storage, etc. U.S. Pat. No. 6,396,239 describes a portable solar array that consists of a box with a solar panel connected to it in a similar manner as that suggested by Muchow et al. in U.S. Pat. No. 7,230,819. Johnson et al; (U.S. Pat. No. 5,111,127), Benn et al., (U.S. Pat. No. 6,396,239), Fuji et al. (U.S. Pat. No. 4,786,851), Azzam's box with wheels and a panel (U.S. Pat. No. 6,201,181), and Glidden's trailer rather than a box (U.S. Pat. No. 5,969,501) discuss various arrangements. Hickson (U.S. Pat. No. 4,481,562) and Bienville (U.S. Pat. No. 4,315,163) discuss solar powered energy stations which are not portable and which have a fixed angle support structure. Simple solar panels that may deliver a few hundred watts, but are not attached to any form of scaffolding such as Spencer et at (U.S. Pat. No. 5,522,943).

Although a wide variety of solar system solutions are available, the available systems remain hard to operate, require lots of maintenance and oversight and are poorly optimised in terms of energy yields. Moreover, known systems have little or no adjustment for the orientation of the solar panel in relation to the sun rays. In solar energy generation, the better the alignment of the panel, the better the energy yield will result. At best, know mobile solar generation station or system provide a one dimension adjustment wherein the operator is required to rotate the station to obtain additional orientation adjustments. The present invention will provided a system that at least mitigate short coming of the prior art systems.

SUMMARY OF THE INVENTION

The aforesaid and other objectives of the present invention are realized by, generally providing a relatively autonomous modular solar mobile generator.

The systems and methods discussed herein relate to energy delivery systems or stations. The present system will attempt to improve practicability and ease of use in portable energy delivery from renewable energy source. The systems and methods provide a self-contained, portable system that does not required grid connection. The system or station is fully retractable and easily adjusted or angled to optimize energy conversion. The system may provide a deployment system, solar panels, lift mechanism, and energy storage systems.

The system in accordance with the present invention may be embodied as a modular solar mobile generator comprising a base section comprising a top portion having a central aperture, wherein the base section comprises a base section comprising a top portion having a central aperture. The base section comprises a frame and a control panel. The system further comprises a pivoting mechanism allowing the pivoting in all directions within a plan. The system further comprises an expendable longitudinal support arm, wherein the expendable support arm comprises a lower end and an upper end, wherein to the expendable longitudinal is attached to the frame with a mechanism allowing pivoting in all directions and wherein the expendable longitudinal support arm stretch out of the central aperture. The system comprises a solar energy generating component comprising a central solar panel attached to the upper end of the expendable longitudinal support arm and at least one primary solar panel rotatably attached to the central solar panel.

According to another aspect of the invention, the modular solar mobile generator may further comprises at least one secondary solar panel rotatably attached to one of the at least one primary solar panel.

According to another aspect of the invention, the at least one secondary solar panel is a drawer-type panel comprising a slidable solar panel.

According to another aspect of the invention, the central solar panel is a drawer-type panel comprising a slidable solar panel.

According to another aspect, the base section further comprises at least one attachment point on each top portion extremity and wherein the central solar panel comprises a top surface and a bottom surface and at least one receiving attachment point located on the bottom surface.

According to another aspect of the invention, at least one attachment point located on the base section is a ball joint and the at least one receiving attachment point located on the bottom surface of the central solar panel is hydraulically powered.

According to a further aspect of the invention, a cable is attached to at least one attachment anchors and the base station is affixed to centre solar panel and to at least one attachment anchors affixed to the upper portion of the base station.

A method for deploying a modular solar mobile generator is also disclosed, wherein the method comprises the steps to transport the modular solar mobile generator to a desired location, activate the deployment, unfold the plurality of solar panels of the solar energy generating component, stretch the expandable longitudinal support arm to allow longitudinally or laterally tilting of the solar energy generating component at a desired angle and activate the generation of energy.

According to an aspect of the present invention, the modular solar mobile generator (SMG) described herein sill provide a versatility in the number of solar panel comprised. As such, the present invention will, be adaptable depending on the embodiment to the needs of the user. The modular aspect of the SMG also renders this mobile energy regeneration station suitable for a wide variety of uses. It may be suitable for both civil and military uses. Likewise, it may be used by private citizens, corporation, or the public sector. Such public sector uses may be in emergency services, remote location or for general energy uses in time of high energy consumption.

According to an aspect of the present invention, the SMG provides a mobile energy generation solution that is suitable for transportation by various means. As such, the SMG may be transported on roads, by air or on water. The system is thus suitable for transposition by trailer, regular or using its integrated road transportation platform. The device also allows transport by helicopters to remote location. The later transportation is especially useful at times where natural disasters occur and when some locations are cut from the conventional energy sources. Lastly, the SMG may be transported on boat or on amphibious vehicles. Accordingly, the SMG in accordance with an aspect of the present invention would be of great use, for military usage thereby providing the power required to operate in a wide variety of terrains and environments hostile or not.

According to an aspect of the present invention, the SMG described herein is designed for deployment in a wide variety of settings. It is designed for both manual and autonomous deployment.

According to an aspect of the present invention, the SMG provides a suitable solution for energy generation while having the ability to act as an energy storage system. In such an embodiment, the SMG provides the ability to increase energy elasticity within a certain system or localized grid. Therefore, the system is designed to store energy at times of low energy consumption and to provide energy at times when energy consumption is higher than the energy produced. Such feature of the SMG is typically achieved through the use of an energy storage system comprised within the SMG. A typical energy storage component is lithium ions battery. The energy storage device may be adjusted to increase or decrease the energy elasticity depending of the use of the SMG.

According to an aspect of the present invention, the SMG is designed to autonomously align an energy generation section, being an unfolded solar panel, with the sun to optimize the energy yield without any human interaction or with minimal human intervention. Consequently, the SMG in accordance with the present invention requires little to no oversight during operation while generally providing an optimized energy yield.

According to an aspect of the present invention, the SMG provides an alternative electricity directly into an electrical network to improve the network efficiency. As such, the SMG may act as a support mechanism in time of high energy consumption.

According to an aspect of the present invention, the SMG may provide an emergency source of energy in time of crisis or natural disaster. It may thus act as a protection against system failure and ensure continuity of service.

According to an aspect of the present invention, the SMG may act as a backup mechanism for the electrical grid in developing nations where the electrical network is of poor quality and require energy input for support.

According to an aspect of the present invention, the SMG may act to minimize fuel consumption and to improve the performance of grouped generators. The SMG may also be configured to inject electricity into a network of micro generators.

According to an aspect of the present invention, the SMG may contribute to strategies of energy diversification and reduction of intermittent energy deprivation by injecting energy in other environmentally dependant energy network (wind/hydraulic).

According to an aspect of the present invention, the SMG may use the existing power sources (i.e. the power grid) to reload or recharge its energy storing component thereby becoming a reliable energy source for transportation. As such, the SMG could store currently available energy from one location and may provide the electrical energy deprived locations (i.e. remote locations).

According to another aspect of the present invention, the SMG may be configured with additional modules thereby providing comprehensive functions to remotely located users. One of the additional modules which are envisioned as part of the design of the SMG is a water treatment module, preferably a reverse osmosis water treatment module. Such module would typically be housed within the base section, preferably in the large section provided at the rear of the SMG. For example, the addition of a water treatment module may advantageously benefits the user in various conditions where water in the vicinity is not suitable for human consumption.

According to one aspect of the present invention, the base section of the SMG is suitable for most embodiments. As such it would be possible for a user to convert a 12-panels SMG into a 24-panels SMG by only replacing the energy generation component of the SMG. Consequently, the design of the SMG advantageously reduce manufacturing cost and requirements as the device shares a similar base section on which functions and/or module may be installed. In addition, the different add-ons/modules/component of the device may be interchanged one with the other, resulting in a modular and adaptable system. Likewise, having a shared base section between different units is beneficial to any array of SMG of various sizes as the number of solar panels is a major distinction between the units. Consequently, the number replacement and maintenance part types for such an array of SMB may be kept to a minimum as they are share by all units.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 1 is a rear view of a folded 24-panel SMG embodiment.

FIG. 2 is a perspective view of the folded SMG of FIG. 1.

FIG. 3 is a side view of a folded 24-panels SMG.

FIG. 4 is a side view of the SMG embodiment having housing module's door opened FIG. 5 top cross sectional view of a base section of the SMG of FIG. 1.

FIG. 6 is a perspective view of an SMG embodiment having primary support member.

FIG. 7 is a rear view of SMG embodiment having housing module's door opened

FIG. 8 is a perspective view of the folded SMG of FIG. 6.

FIG. 9 is a perspective view of the SMG of FIG. 6.

FIG. 10 is a side view of a folded 24-panel SMG embodiment having secondary support members.

FIG. 11 is a rear view of the SMG of FIG. 10.

FIG. 12 is a perspective view of the SMG of FIG. 10.

FIG. 13 is a top view of the SMG of FIG. 10.

FIG. 19 is a perspective view of a folded 24-panel SMG embodiment having primary support members.

FIG. 20 is a perspective view of the SMG of FIG. 19 also having secondary support member.

FIGS. 21-27 are top and lateral views of a folded 12-panel SMG embodiment deployed on a transport platform.

FIGS. 28-31 are rear and lateral view of a 16-panel SMG embodiment deployed on a transport platform.

FIG. 32 is a lateral view of the 16-panel SMG embodiment deployed without a transport platform.

FIG. 33-38 are rear and lateral views of various embodiments deployed on a transport platform.

FIGS. 39-42 are cross-sectional, perspective and rear views of an exemplary securing mechanism.

DETAILED DESCRIPTION OF THE PREFERRED EMBODIMENT

Figure 14:
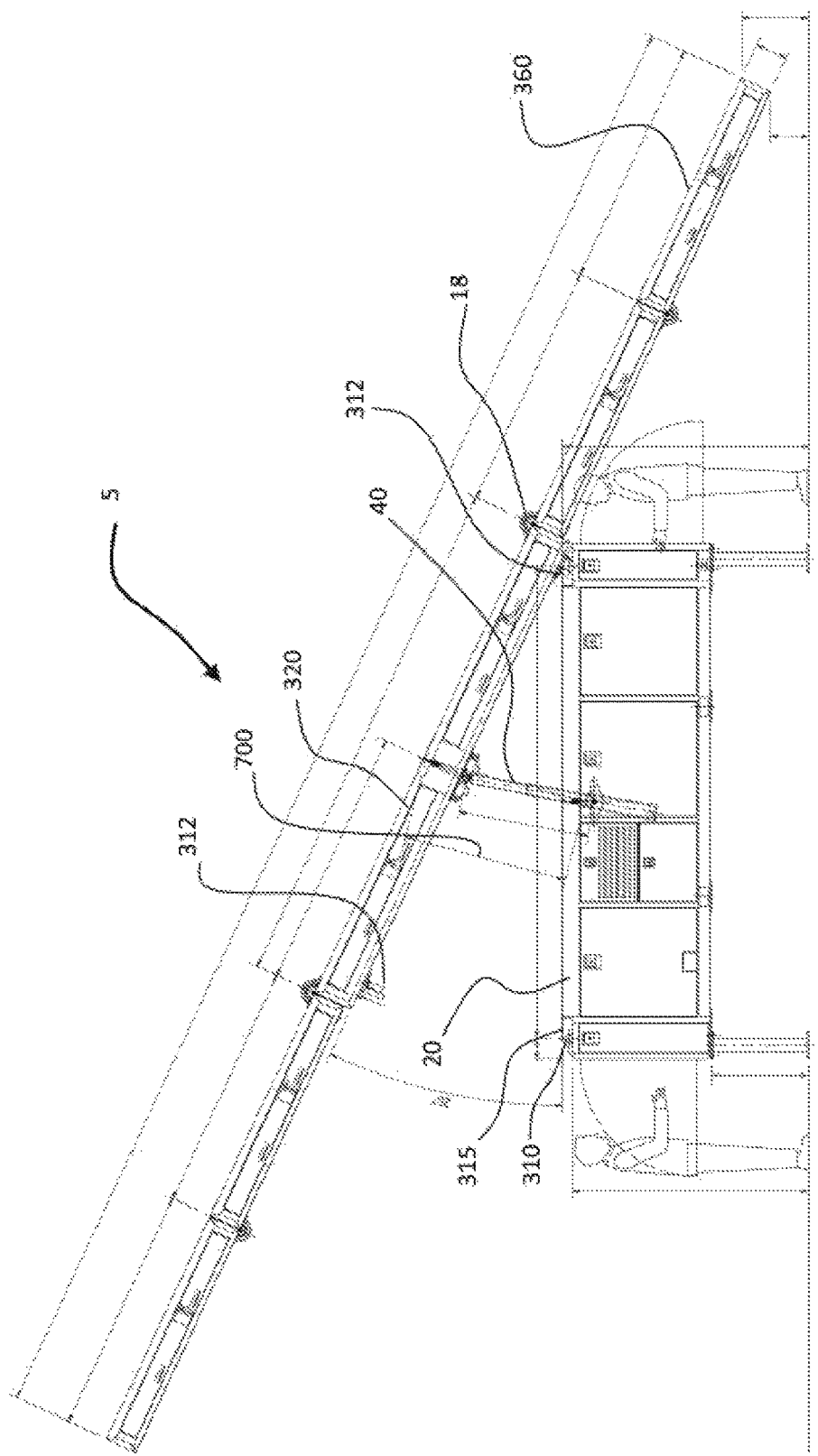
FIG. 14 is a lateral view of an unfolded 24-panel SMG embodiment having primary support members.

A novel modular solar mobile generator will be described hereinafter. Although the invention is described in terms of specific illustrative embodiments, it is to be understood that the embodiments described herein are by way of example only and that the scope of the invention is not intended to be limited thereby.

Now referring to FIGS. 1-3, a modular solar mobile generator (SMG) 5 in accordance with the present invention is shown. The SMG 5 comprises a base section 20 and a solar energy generating component 10.

The base section 20 typically is made of a frame 50. Now referring to FIGS. 4-7, the frame 50 typically forms a rectangular prism or box and is internally divided in one or more sections or compartments. In the preferred embodiment, the first section comprises the control panels and auxiliary systems. The second section comprises the energy storage system such as lithium ions batteries. The third section comprises the hydraulic systems. The last section may be used for storage or may comprise add-on systems such as a water treatment system or diesel power generator. Typically, the frame 50 comprises a rigid armature or structure made of a plurality of members. The rigid armature is typically made of metal but may be made with any rigid material designed to resist to heavy charges. Each compartment may be configured to receive different type of modules or skids or may be configured to form a storage compartment. Now referring to FIGS. 4-9, in a preferred embodiment, a generally central compartment, named the housing compartment 22 comprises expendable main telescopic support arm 40 that may be stretched or shrank.

Still referring to FIGS. 4-9, the housing compartment 22 is shown being positioned at the center of the base section 20. Accordingly, a centered housing compartment 22 provides better stability to the telescopic main support arm 40, thus allowing the SMG 5 to support greater loads. The telescopic main support arm 40 is generally attached to the solar energy generating section 10. As such, the frame is generally reinforced toward the housing compartment 22 to ensure the base section 20 is able to withstand the weight of the unfolded solar energy generating module.

In a preferred embodiment, now referring to FIGS. 8-13, the base section 20 comprises doors 52, 54 for each of the one or more compartments. The doors 52, 54 are typically configured to open in a vertical orientation or removable to allow opened doors 52, 54 to provide a clear entry to the one or more compartments. Such entry may be needed when adding or removing one or more modules from the compartments.

Figure 15:
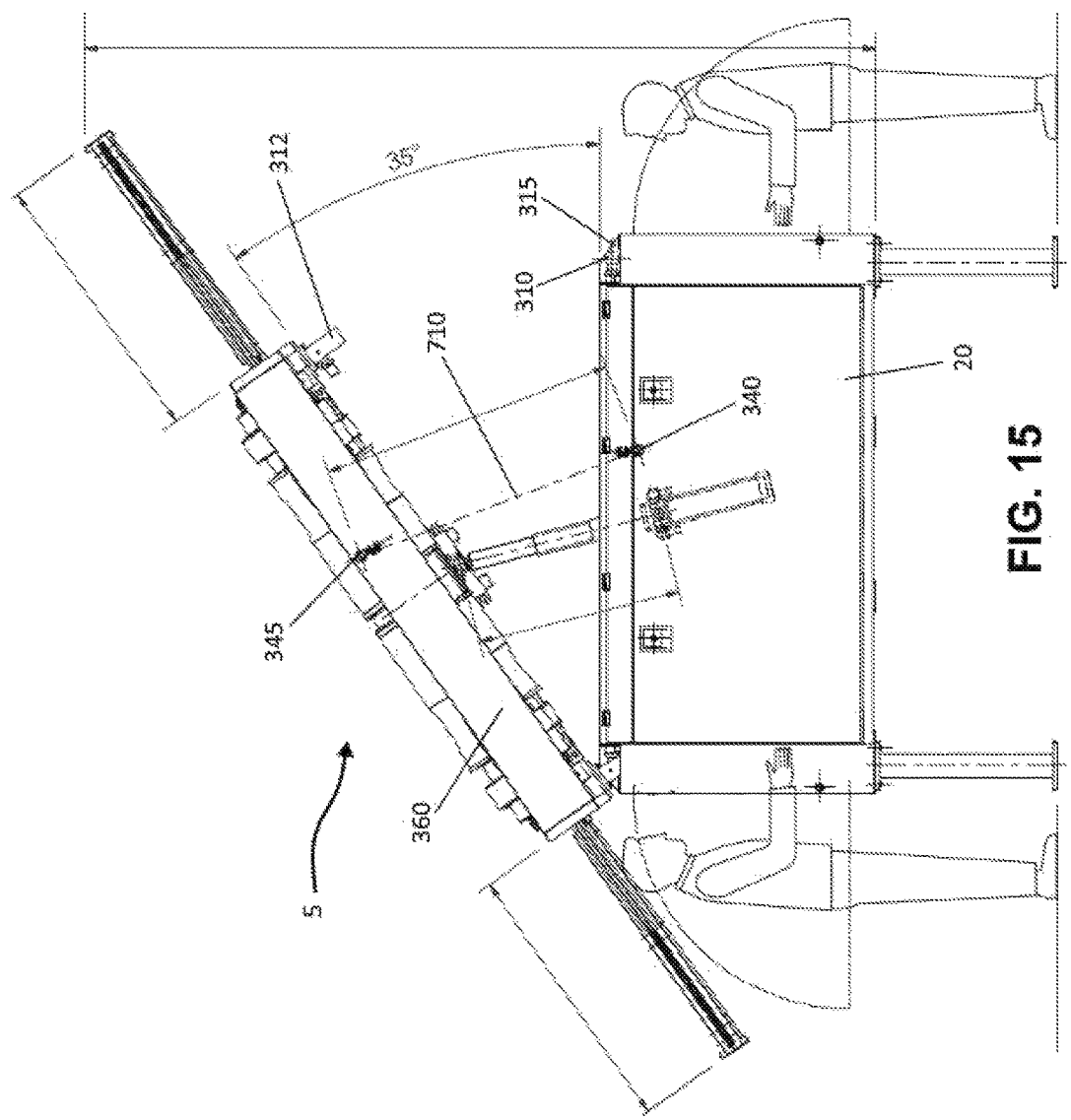
FIG. 15 is a rear view of the SMG of FIG. 14.
Figure 16:
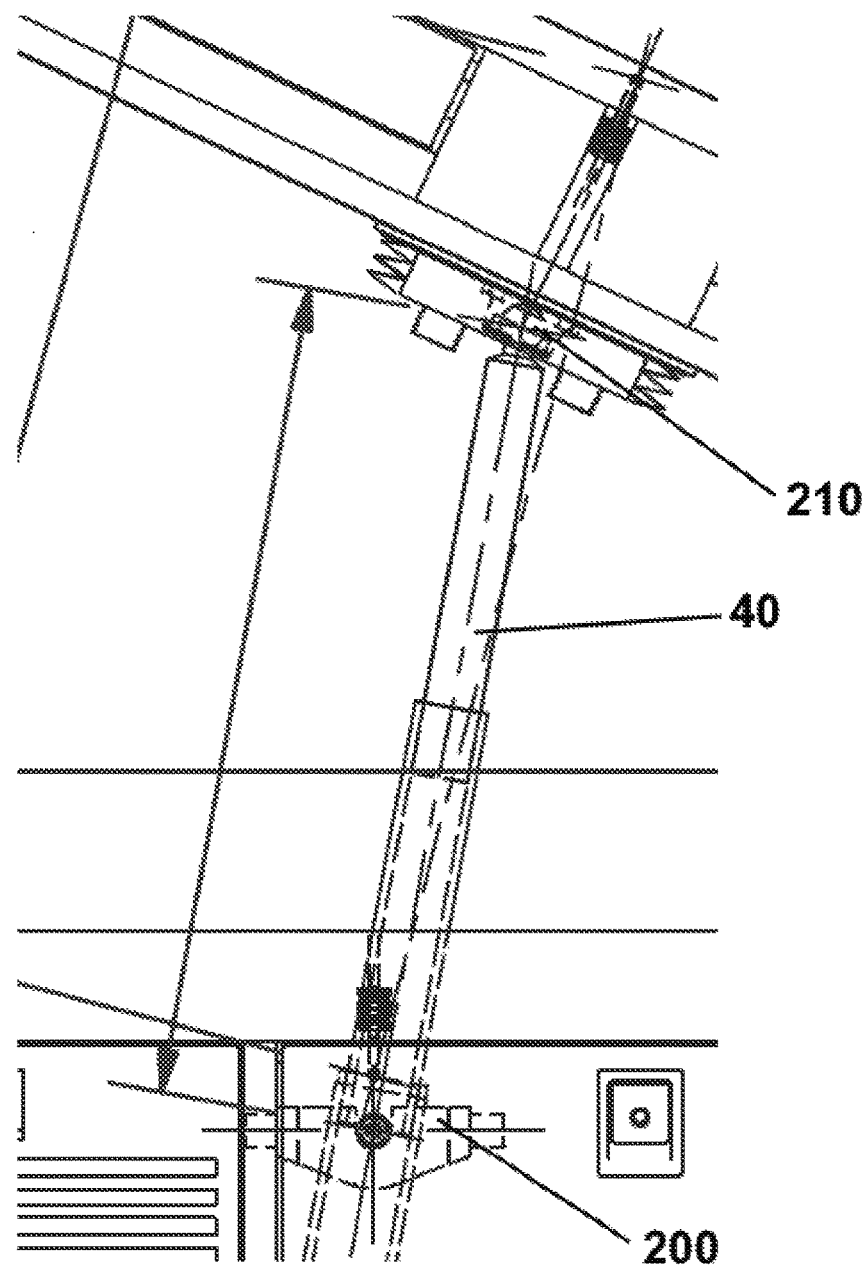
FIG. 16 a closed up view of the main support arm of the SMG of FIG. 14.
Figure 17:
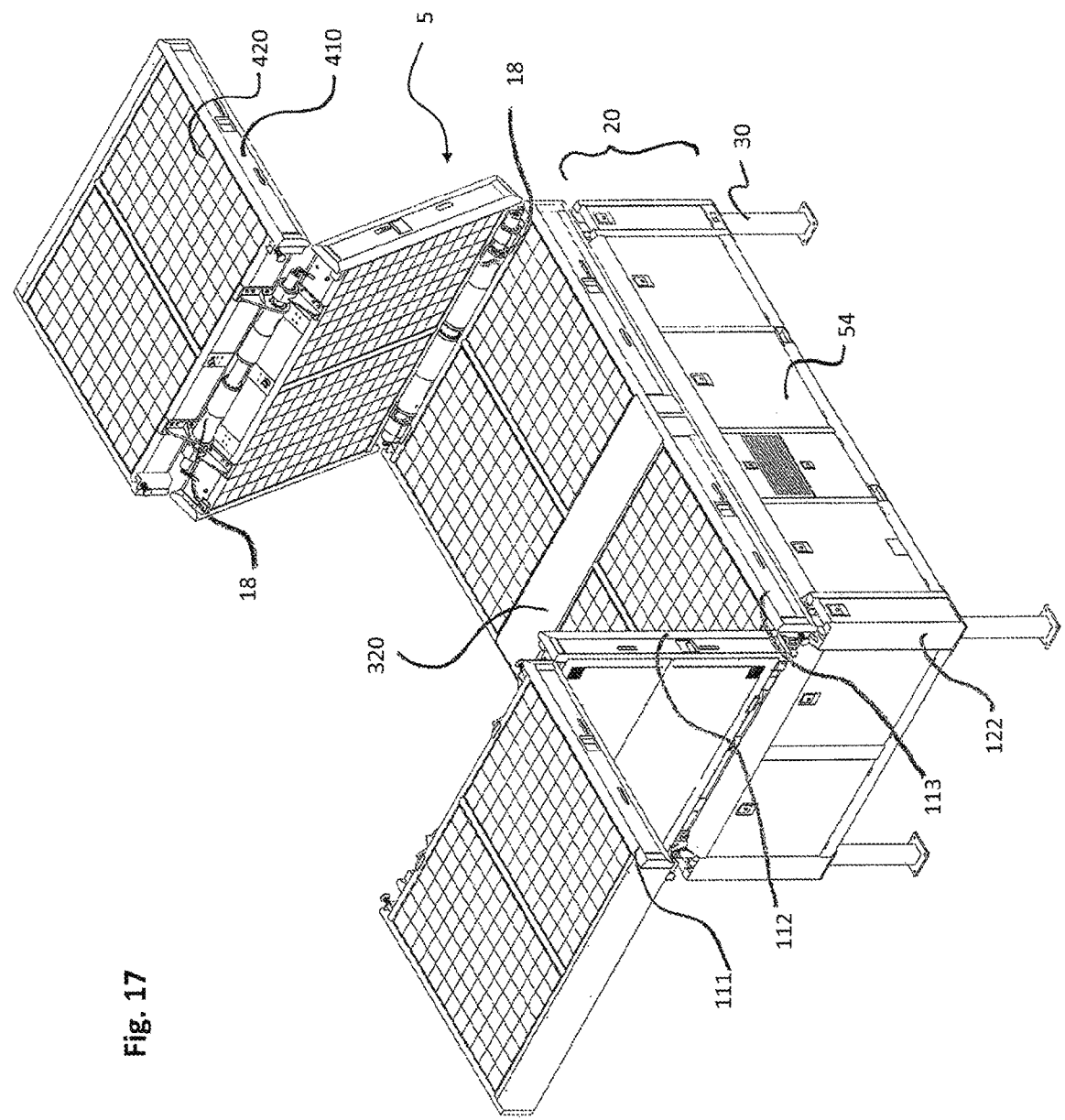
FIG. 17 is a perspective view of an unfolding 24-panel SMG embodiment having primary support members.

Now referring to FIGS. 14-16, the base section 20 houses the main telescopic arm 40. One skilled in the art shall understand that a telescoping arm 40 is used to minimize the required volume of the arm 40. However, in another embodiment, any mechanisms or device that allows the support arm 40 having shrinking and stretching capabilities while minimizing the complexity and volume of the arm 40. Now specifically referring to FIG. 16, the main telescopic arm 40 is fixed to a reinforced section armature of the frame 50.

Still, referring to FIGS. 14-16, the main telescopic arm 40 comprises two ends 200 and 210. The first end 200 is linked by a mechanism allowing the arm 40 to pivot in all directions. Such mechanism is typically embodied as a ball joint. The second end 210 is moving freely. The main telescopic arm 40 further comprises a mechanism 200 positioned between the first 200 and second 210 allowing the arm 40 to pivot in all directions at a second location, preferably in the lower end of the expanded telescopic arm 40 (as shown in FIG. 16). As such, the main expandable arm 40 may pivot in all directions. Typically, such mechanism 200 shall be embodied as a double ball joint system allowing the pivoting in two different directions.

The system is configured to allow the attachment of the energy generating component to be attached at least two attachments point having a female end located on the solar energy generating section 10 and a male located at each corner of the base section 20 to restrain the movement to specific directions, either laterally (FIG. 117) or longitudinally (FIG. 118), for placing the panel 320 in a total of 4 different positions. An attachment linkage 200 connects the main telescopic arm 40 to the frame 50 and comprises two pivoting mechanisms, thus allowing the support arm 40 to move laterally or longitudinally. The telescopic expansion of the telescopic support arm 40 may be manually or autonomously actuated, such as an automatic system powered by hydraulic or electric systems. The second end 210 of the telescopic support arm 40 is attached to the main energy generation section 320 using a pivoting mechanism, such as a ball joint. The maximum tilting angle of the main energy generation section 320 is thus achieved by the maximum tilting of the pivoting angle of the attachment linkage 200 and of the pivoting mechanism of the second end 210. Consequently, the combination of the ball joints 200, 210 and the freedom of movement of the attachment at the housing compartment 22 allow the tilting of the solar energy generating section 10 of up to 55 degrees laterally (FIG. 15) and up to 45 degrees longitudinally (FIG. 14).

Still referring to FIGS. 14-16, the base section 20 comprises at least one attachment point 310 on each upper corner 315, located on top of the corner units 122. These attachment points 310 are attached to the central section 320 of the solar energy generating component 10. When the SMG 5 is operated in energy generation mode, a manual or automatic mode allows the control module 620 comprising one or more solar energy sensors to autonomously detect the optimal orientation in which the solar energy generating component 10 shall be positioned. The optimal position of the solar energy generating component may be calculated by a control module 620 located in the base section 10 which takes into account the two possible axes of movement. The control module 620 selectively enables the attachment mechanism of two of the four attachment points 310 (one on every upper corner) and activates the main telescopic arm 40 to stretch to the optimal length.

Still referring to FIGS. 14-16, the upper portion of the base section 20 and the lower portion of the solar energy generating component 10 may comprise attachment anchors 340, 345 for cables. The attachment anchors 340, 345 act as to reinforce the tilted solar energy generating component when used in areas having harsher weather conditions, such as strong winds. The anchors 340, 345 are typically solidly welded or integrated to the frame 50 of the base section 20. The attachment means further secure the unfolded panel 360 prior to adjustment for optimisation of the energy generation. A cable is generally anchored to both the attachment anchors 345 of the solar energy generating section 10 and to its corresponding attachment anchors 340 of the frame. In embodiments without an autonomously controlled system, the cables are typically used to limit the extension of the telescopic arm to a specific predetermined critical angle or length beyond which the solar panel 320 should not be tilted in order to avoid damages to the said solar panel 320.

Typically, the cable 700, 710 shall be made of rigid material such as twisted metal.

Now referring to FIG. 17-20, the solar energy generating section 10 comprises a central solar panel 113 and a plurality of additional solar panels such as panels 111, 112. The main solar panel 113 is attached to the base section 20 of the SMG 5. In a preferred embodiment, a first additional solar panel 112 is pivotally attached to the main solar panel 113 and a second additional solar panel 111 is pivotally attached to the first additional solar panel 112. In such an embodiment, the solar panels 111-113 may be folded one over the others. The interconnection mechanism 18 may be manually or automatically activated. Typically, the interconnection mechanism 18 comprises a hydraulic or electric rotating actuator. The folding of the solar panels 112, 112, 113 minimizes and/or optimizes the required volume for transportation, as shown in FIG. 112.

Now referring to FIGS. 4-5, 7 and 14-15, the solar energy generating section 10 comprises attachment points 312 on each corner of the central solar panel 320. These attachment points 312 provide stability to the system during operations. In operations, two attachment points 312 are generally engaged with their corresponding attachment points 310 located on the upper corner 315 of the base section 20. The engagement of the attachment points 310 and 312 shall be done prior to tilting the unfolded panel 360. The attachments 310 and 312 allow the SMG to harsher weather conditions. This added level of stability increases the versatility of the SMG and renders it more suitable for various uses such as disaster relief operations.

Now referring to FIG. 39-42, is shown an example of a securing mechanism for securing the solar energy generating section to the base section attachment points typically. This exemplary securing mechanism 75 comprises a latching member 80, a locking member 82 and a tubular enclosure 84 having a side aperture 89. As such, the securing mechanism 75 selectively allows two degrees of freedom enabling lateral and longitudinal tilting of the solar energy generating section 10. Understandably, the exemplary securing mechanism 75 could be configured with the latching member 80 and the enclosure 84 being integrated to either the base section 20 upper corner 315 or to each corner of the central solar panel 320 with the locking member 82 on the complementary side (base section 20 upper corner 315 or corner of the central solar panel 320). The securing mechanism 75 may be manually or autonomously unlatched. The actuation of the mechanism will trigger an actuator piston 86 which will apply pressure against the upper portion 88 of the latching member 80 thereby disengaging the locking member 82 from the latching member 80. To be engaged, the locking member 82 shall be inserted within the tubular enclosure 84. The latching member 80 shall be pivoted outward by the force of the locking member 82 thus allowing the locking member 82 to be inserted completely into the tubular enclosure 84. Once the locking member 82 is completely inserted, the latching member 80 pivots inwardly with the tension of a spring 83.

Figure 18:
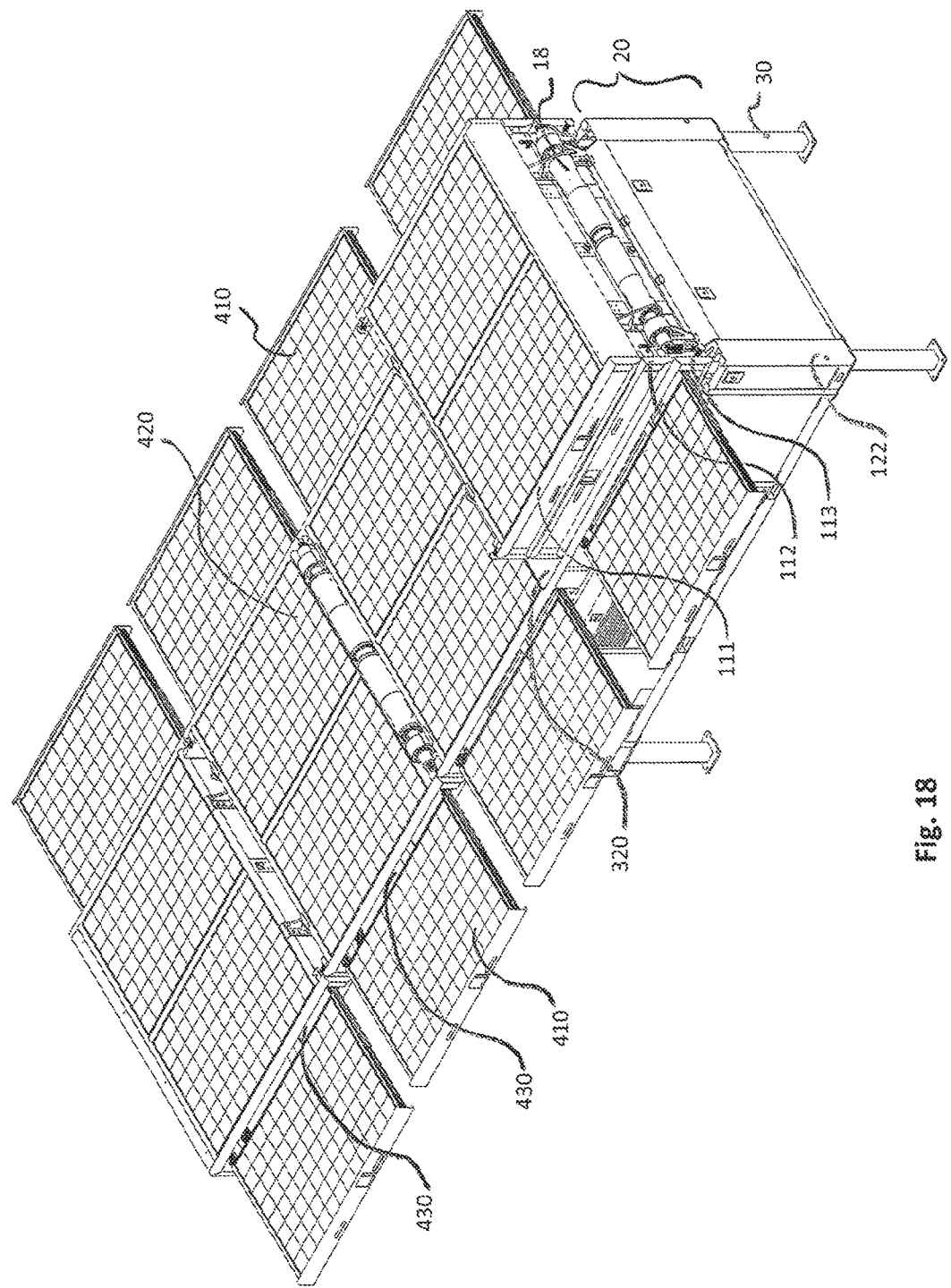
FIG. 18 is a perspective view of a partially unfolded 24-panel SMG embodiment having primary support members.

In another embodiment, the SMG 5 may comprise different types and configurations of solar panels representing the solar energy generation section 10. The solar energy generation section 10 of the SMG 5 is generally tailored to the use of the station and to the level of required energy. For instance, for lower energy requirements, a 12-panel configuration (as shown in FIGS. 21-27) may be sufficient whereas higher energy needs may require a 24-panel (as shown in FIGS. 1-20 and 38) energy generation section. In such embodiment, the plurality of panels 111, 112, 113 comprises side enclosures 430 configured to receive a sliding panel 410 (as shown in FIG. 18). The sliding panel 410 may be expanded to further increase the area of the unfolded energy generating component 10. Such sliding panels 410 are also known as drawer-type panel as they may be operated as a typical drawer with locking on position. The number of drawer-type panels 410 is adapted to the number of panels required in the SMG 5 to produce a specific level of energy.

The drawer-type panels 410 may be manually or automatically expanded. In addition, the SMG 5 may comprise sensors detecting the amount of pressure the solar energy generating section is subjected to, such as load of snow or mud. As such the SMG 5 may be programmed to automatically retract the drawer-type panel upon attaining a certain critical pressure threshold to avoid being damaged by the external conditions. When the autonomous retraction of the drawer-type panels does not sufficiently reduce the said, the system may automatically trigger folding of the panels. Such preventive folding mechanisms reinforce the autonomy of the system thereby reducing the oversight requirement of the system during operation. Additionally, when the system is configured to allow a folded configuration having panels facing outwardly, the SMG 5 may keep on generating energy while being keep in a folded configuration. The system may then be programmed, once the pressure sensor sense a drop in pressure, to autonomously unfold the panels to their fully deployed position thereby resuming the initial energy generation operation.

In the preferred embodiment, the modularity of the system allows single solar panel whether a drawer-type panel 410 or a frame-type panel 420 to be individually replaced or repaired without the need to replace the entirety of the drawer-type 410 or frame-type panel 420. The modularity of the system further emphasizes the increased versatility of the system.

In a 12-panel embodiment, the SMG 5 may be deployed in many configurations. For instance, the 12-panel embodiment may comprise six frame-type panels 420 each comprising two panels (6×2). The 12-panel embodiment may as well comprise four frame-type panels 420 each comprising two panels and each having one drawer-type panel 410 (4×3).

In a 16-panel configuration, the SMG 5 may be deployed also in many configurations. For instance, the 16-panel embodiment may comprise six frame-type panels each comprising two panels and an additional drawer-type panel 410 on either side of the central frame-type panel 420 (6×2+4). The 16-panel embodiment may as well comprise four frame-type panels 420 each comprising two panels and each having one drawer-type panel 410 on either side (4×4).

In a 24-panel configuration, the SMG 5 generally comprises six frame-type panels 420 each comprising two panels and an additional drawer-type panel 410 on either side of each frame-type panel 420 (6×4).

One skilled in the art will understand that the SMG 5 in accordance with the present invention may be configured in many configurations in order to adapt to various environments and requirements. The configuration and number of solar panels will depend on the energy needed, the location or the use of the equipment. In a region with very strong winds or heavy snow a configuration without drawer may be more suitable.

In another embodiment, now referring to FIGS. 6-9 the SMG may additionally comprise a plurality of primary support members 30. In such an embodiment, the base section 20 is the middle portion of the SMG 5. The base section 20 is located under the solar energy generation section 10 and is supported by the primary support members 30.

Still referring to FIGS. 6-9, the base section 20 comprises a plurality of corner units 122, each corner unit 122 housing one or more primary support members 30 connected to the SMG 5 thereunder. In this other embodiment, the SMG 5 remains stable by the attachment of primary support members 30 to the base section 20. In a preferred embodiment, the SMG 5 comprises four primary support members 30, all attached or integrated to a corner unit 122 of the SMG 5 to provide stable support for the base section 20.

The primary support members 30 may be manually affixed underneath each corner units 122 of the SMG 5. In a preferred embodiment, the primary support members 30 are integrated within the corner units 122 of the base section 30 are preferably controlled with actuator, such as hydraulic actuator. In such a preferred embodiment, the human intervention required for deploying the unit is minimized. Additionally, the hydraulically controlled primary support members 30 may be autonomously adjusted with level systems comprised within the base section 20. As such, the primary support members 30 of such an embodiment may be self-deployed at the desired leveling of the base section 20. Accordingly, minimal human labor is required to deploy the system. Such a deployment system allows fast and efficient deployment of the SMG 5.

In another embodiment, where stronger support is required, the SMG 5 may further comprise secondary support members 124. The secondary support members 124 increase the stability of the SMG 5. Such secondary support members 124 are most likely required in windy environment or unleveled terrains and preferred for use in situation where the energy generation component 10 is configured with 16 panels (FIGS. 32-36) and 24 panels (FIGS. 1-20 and 38). In such an embodiment, the secondary support members 124 are typically adjustable in order to adapt to a more of the rugged terrain. As such, the secondary support members 124 may be adjusted to allow the base section 20 to remain at a desired angle. The secondary support members are typically housed in corner units 122 and may be covered by a door for ease of access.

In an embodiment comprising secondary support members 124, the primary support members 30 are optional.

In another embodiment, the SMG 5 may comprise both primary 30 and secondary support members 124. As such, an embodiment of the SMG 5 may comprise both autonomously controlled primary 30 and secondary 124 support members integrated in the base section 20. In such an embodiment, the support members 30, 124 are typically housed in the corner units 122. As shown in FIG. 20, the expandable primary support members 30 are generally located inward and the secondary support members 124 are located outward.

In a further embodiment, the SMG 5 may comprise secondary support members autonomously controlled and primary support member manually operated. In this latter case, the secondary support members 124 would be housed in the corner units 122 while the primary support members 30 would be manually affixed under such corner units 122. As such, the secondary support members 124 may be strong enough to support the weight of the SMG 5, thus they may be the only support to the unit.

The secondary support members 124 may be especially useful for use with the transport platform. Where the SMG 5 is used with the transport platform of some kind of trailer, the secondary support members 124 are handy for jacking the SMG 5 from the trailer, thus allowing the removal of the trailed. In case of such an operation, the secondary support members 124 increase the automation of the deployment. Likewise, it allows deployment with limited human involvement.

In another embodiment, with primary member may be attached to the ground. The attachment to the ground is typically achieved by the use of fasteners or by the use of stake. Attachments to the ground provide additional stability to the system while securing the SMG 5 to insure resistance to harder weather conditions.

In addition, embodiments may also additionally comprise an integrated transport section 500 (FIGS. 22-31).

Furthermore, to increase the versatility of the system, the SMG 5 according to the preferred embodiment may comprise an optional power generator using gas or diesel.

Now referring to FIGS. 4-5 and 19, in the preferred embodiment, the base section 20 comprises a plurality of housing compartments 24, 28 for add-on modules. The modules typically comprised in the base section 20 of the preferred embodiment are the control panel 620, the energy storage module 26, the hydraulic module 610 and the energy management modules 615. The base section preferably provides storage space for diverse connectors and equipment required for maintenance and adjustment. The base section 20 houses the energy storage module 26 integrated within the SMG 5.

The SMG 5 may be configured in two main modes of operation: transportation mode and operation mode. In transportation mode, the solar panels of the SMG 5 are folded and may be used for transportation (as shown in FIG. 21). When configured in transportation mode, the SMG 5 requires minimal and/or optimal volume which is optimal for transportation. When configured in operation mode, the SMG 5 is expanded and/or unfolded as shown in FIGS. 17-18 and 32-39. In such a configuration, the generating section is expanded and covers a larger area. The expanded panel 110 (FIGS. 6, 9, 14, 15) allows the SMG 5 to capture the maximum sun rays in order to maximize the level of generated energy by the SMG 5.

According to one embodiment of the present invention, the generation of energy using the SMG 5 generally requires transporting the SMG 5 to the desired location and activating its energy generation mode while in its folded configuration using the control panel. In some embodiments, the energy generation component 10 may be used unfolded. In such as configuration, the upper frame-type panel 420 outwardly facing the sun generates the energy. As such this may provide a suitable power source in extreme weather conditions in which unfolding the panels may be impossible.

In the preferred embodiment, the generation of energy typically requires activation of the operation mode through the control panel 620. The activation of the operation mode will generally trigger a series of event that may be either manually or automatically completed.

The autonomous deployment system allows the SMG 5 to be deployed with very limited human interactions. The system requires a user to move the system to the desired location and activates the deployment procedures. Although using the SMG on a trailer may not be optimal as it may restrain the adjustment of the unfolded panel, it may adequately generate energy while on a trailer or transportation platform.

In the preferred embodiment, the SMG 5 would be dropped or removed from the trailer or transportation platform either manually or automatically.

Accordingly, depending on the SMG 5 location, whereas it is installed on a trailer or is integrated to a delivery platform 500, the secondary support arms 124 may expand and raise the SMG 5 over the transporting vehicle. Such raising procedure allows the SMG 5, to be self-supporting and permit the removal of the trailer or platform 500. Then, as the trailer or platform 500 is removed, the user may execute a second stage of deployment. In its automated version, sensors may be programmed to automatically detect the progress of the deployment process and trigger the completion of the first stage (removal of the trailer) and initiate the next deployment steps. Upon removal of the trailer or transportation platform 500, the SMG 5 may stay as is (supported by the secondary support members) or use primary support member 30.

When using the primary support members 30, the following steps for the SMG 5 is to expand the primary support members 124 and if provided with that feature, to adjust the SMG 5 to a leveled position. Depending on the load and terrain, the secondary arms 124 may be kept in place as additional support or be retracted to their retracted position.

In another embodiment, now referring to FIGS. 6-9, the primary support members 30 may be manually fixed under the corner units 122. The person with the skills in the art will understand that the SMG may adequately function without any support member (FIGS. 1-3). However, where such support members 30 are used, the height of such support should preferably be greater than the height of the doors 52, 54 so as to allow the doors 52, 54 to vertically open (FIG. 8). In another embodiment, the doors 52, 54 are designed to be easily removable. Such a design allow easy access to the modular compartments even if the base section 50 is directly installed on the ground or comprises support member 30 having reduced length. Removing the removable doors enable the user to improve access to the modular compartments, especially where the system's support member are absent.

Upon deployment of the base section 20 on firm support, deployment of the energy generating section 10 may be initiated. Again, the deployment of the energy generating section 10 may be manually initiated or autonomously managed depending on the embodiment of the present invention. The deployment of the energy generating section 10 comprises the initial step of unfolding the plurality of frame-type solar panels 420. Depending on the configuration of the system and on the number of solar panel, the solar panels will be unfolded in a controlled manner as to expand in a single unfolded panel 360. If the SMG 5 comprises lateral enclosed panels or drawer-type panels 410, the deployment of the said drawer-type panels 410 is activated as soon as the unfolding step is completed. This unfolding of the energy generating section 10 completes the deployment procedure.

According to one embodiment, now referring to FIG. 18, although complete unfolding is preferred partial unfolding may be prefer where space is restrained or where complete unfolding could result in higher strain on the SMG due to weather condition. Likewise, partial unfolding may also be combined with the deployment of the drawer-type panels.

In another embodiment, upon complete unfolding of the panels, the system may additionally lock the panel as one large solar panel. Such a mechanism is most useful to prevent failure of the folding and unfolding mechanism.

Upon completion of deployment, operation mode may be initiated. The operation mode is generally initiated using the control panel 620. However, it is also envisioned that initiation of operation mode be initiated remotely. Operation mode typically starts with analysis of the optimal adjustment of the panel within constraints of the SMG 5. Then, the control actuates either the longitudinal or lateral attachment' of the main expandable arm 40. While the direction of the main expandable arm 40 is locked, so is the two attachment point to attain the optimally determined position of the unfolded panel.

The solar energy generation section 10 need to be tilted up with the actuator member 22 to face the sun. Manual deployment is most often used in the event of an impossibility to activate the autonomous deployment. The manual deployment also serves as a failsafe mechanism in case of weakness in the autonomous deployment mechanism.

Once fully positioned, the SMG 5 may be used as an energy generating system. One could also start generating energy as soon as unfolded. As such, while the system is adjusting to its optimal position, the SMG may already be generating energy. When embodied as an autonomous version, the activation of the energy generation actuates the embedded sun detection function. In one embodiment, the SMG 5 autonomously adjusts the orientation of the solar energy generation section 10 to one of the 4 angles possible as well as the gradient to optimise the energy generation. In a further embodiment, a sun tracking system may be integrated to the SMG 5 in order for the system to autonomously adjust the orientation of the deployed solar panel toward the sun as the day goes by, thereby optimizing the energy generation.

The increased versatility of the support member deployment is highly desired in various emergency scenarios. Similarly, the self-deployment ability is required in hostile deployment which renders the present system suitable for military and paramilitary uses.

The energy storage module is typically fitted with lithium ions battery 26. The capacity of the battery can be done in different configuration in terms of capacity. Any suitable energy storage module could be used without departing from the present inventive concept.

In a preferred embodiment, the SMG 5 provides an AC voltage of 120 or 230V single-phase or three-phase 400 V 460 V 50 or 60 HZ. Electricity is generally independently supplied by 12 (FIGS. 21-24), 16 (FIG. 32-36) or 24 (FIGS. 1-20 and 38) photovoltaic modules. One skilled in the art would understand that any other configuration may be used in order to adapt to specific environment and conditions. Typically, each photovoltaic module produces 345 W of energy with a photovoltaic power of 4, 5 or 8 kWp. In addition to photovoltaic modules, SMG 5 typically include Li-ion batteries and one or more diesel or gas generator backups also helping in fulfilling their function of continuously providing electricity.

One feature of the present invention is the ability of the SMG to provide electricity in a continuous manner using the lithium ions batteries to store the electricity not consumed in low consumption period and provide such energy during periods of greater demand. Optionally, a mobile solar generator can handle periods of peak consumption.

According to an embodiment of the present invention, the mobile solar generator is equipped with an automated deployment system. In such an embodiment, the photovoltaic modules unfold and fold up automatically or semi automatically using a system of hydraulic cylinders and of drawers. In a preferred configuration, the footprint of the "folded" modules system is typically 2.25 m×4 m×2 m (W×L×H), while the footprint of the "unfolded" modules system is typically 25, 33 or 50 m².

According to another embodiment of the invention, the SMG 5 is provided with a system increasing mobility and portability. The SMG 5 may be placed on an optional trailer for moving SMG 5 easily using a vehicle. It also can be placed on a small truck. Mobility SMG 5 is provided with the same constraints as a conventional trailer (bitumen road or forest of good quality). Furthermore, the system is designed to allow the unloading of the trailer the generator independently. SMG 5 with or without optional trailer can be craned or heliported. The total weight of the equipment without trailer is typically about 1.5 tons.

This SMG 5 brings together in a single transportable system components photovoltaic modules, energy storage (lithium ion batteries), power converters, network management, mechanical and fast way to expand/collapse photovoltaic modules, system mechanical allowing adjustment of the inclination of the photovoltaic modules based on the location of MSG from the sun and an optional detachable trailer all and/or auxiliary power package. As such, the expandable main arm support 40 may tilt the panels 360 in order to optimise the yield of energy generated while maintain the two axis (longitudinally and laterally) of freedom available to the main expendable arm 40.

The method for using a SMGs 5 in accordance with the present invention are generally as follows:

a. Creation of the network: SMG 5 requires the frequency and voltage. An optional generator (diesel, gas, . . . ) included in the SMG 5 can improve the continuity of service of electricity. Occasionally, the SMG 5 can be recharged from a wall outlet.

b. Functioning backup/Uninterruptible Power Supply: SMG 5 only works when the network fails. When consumers are mains powered, batteries SMG 5 recharge. When a mains failure occurs, a relay is activated and then provides the SMG 5 electric power to consumers. The transfer is may be automatic without power failure or manual.

c. Injection on a network of group generators: The SMG 5 injects energy into the network continuously. During the day, some of the power generators (if necessary) is used to recharge the batteries of SMGs 5. During the night, the batteries will decrease the share produced by generators. The SMG 5 helps improve stability of system frequency and voltage.

In another embodiment, several SMG 5 could be bundled or connected in series or in parallel in order to increase the total power of the system. Various combinations of SMG 5 are envisioned to either add to local power grid or to create a localized grid.

The SMG 5 may use the existing power sources (i.e. the power grid) to reload its energy storing component thereby becoming a reliable energy source for transportation. As such, the SMG 5 could store currently available energy from one location and may provide the electrical energy deprived locations. In order to use such feature, the user is required to connect an electric energy source to the control panel to charge the empty batteries. Then, after charging of the batteries, it is possible for the user to transport the SMG to the location where power is required and use it as such.

While illustrative and presently preferred embodiment(s) of the invention have been described in detail hereinabove, the scope of the claims should not be limited by the preferred embodiments set forth in the examples, but should be given the broadest interpretation consistent with the description as a whole.

The invention claimed is:

1. A modular solar mobile generator comprising:
  a) a base section comprising:
    i) a frame;
    ii) a top portion having a central aperture,
    iii) at least two attachment points;
  b) at least one pivoting mechanism adapted to pivot the solar energy generating component about at least two different non-parallel planes;
  c) an extendable longitudinal support arm comprising a lower end and an upper end, the lower end of the extendable longitudinal support arm being attached to the frame and stretching out of the central aperture;
  d) a solar energy generating component comprising:
    i) a central solar panel attached to the upper end of the extendable longitudinal support arm;
    ii) at least one primary solar panel rotatably attached to the central solar panel; and
    iii) a bottom surface having at least two attachment points located on the bottom surface, each of the attachment points of the bottom surface being adapted to mate with at least one of the attachment points of the base section;
  wherein the extendable longitudinal support arm is attached to the solar generating component, the extendable longitudinal support arm being adapted to be pivoted using the at least one pivoting mechanism; and
  wherein the solar energy generating component is configured to be attached yet detachable to the base section with at least two pairs of attachment points of the base section and of the solar energy generating component to restrain the movement of the solar energy generating component to a specific direction.

2. The modular solar mobile generator as claimed in claim 1, wherein the modular solar mobile generator further comprises at least one secondary solar panel rotatably attached to one of the at least one primary solar panel.

3. The modular solar mobile generator as claimed in claim 2, wherein the at least one secondary solar panel is a drawer-type panel comprising a slidable solar panel.

4. The modular solar mobile generator as claimed in claim 1, wherein the attachment points are attached using a securing mechanism, the securing mechanism comprising a latching member, a locking member and a tubular enclosure having a side aperture for selectively allowing two degrees of freedom and enabling the lateral and longitudinal tilting of the solar energy generating component.

5. The modular solar mobile generator as claimed in claim 1, wherein the at least one primary solar panel is a drawer-type panel comprising a slidable solar panel.

6. The modular solar mobile generator as claimed in claim 1, wherein the extendable longitudinal support arm is a telescopic support arm.

7. The modular solar mobile generator as claimed in claim 1, wherein the attachment of the central solar panel attached to the upper end of the expendable longitudinal support arm comprises at least one ball joint.

8. The modular solar mobile generator as claimed in claim 7, wherein the at least one attachment point located on the base section is a ball joint and the at least one attachment point located on the bottom surface of the central solar panel is hydraulically powered.

9. The modular solar mobile generator as claimed in claim 1, wherein the base section comprises a compartment hosting at least a control module for selectively enabling attachment of the attachment points and activates the extendable longitudinal support arm to stretch to an optimal length.

10. The modular solar mobile generator as claimed in claim 1, further comprising a plurality of vertically extendable primary support members comprising a hydraulic actuator.

11. The modular solar mobile generator as claimed in claim 1, further comprising a plurality of vertically extendable secondary support members being housed in corner units of the base section, the corner units of the base section being controlled with a hydraulic actuator.

12. The modular solar mobile generator as claimed in claim 1, further comprising a cable attached to at least one attachment anchor of the solar energy generating component affixed to the central solar panel and to at least one attachment anchor affixed to the upper portion of the base station.

13. The modular solar mobile generator as claimed in claim 4, wherein the locking member has a spherical end and wherein the latching member has a face substantially matching the shape of the locking member.

14. The modular solar mobile generator as claimed in claim 4, wherein the locking member, when engaged with the latching member, is englobed in a cylindrical member.

15. The modular solar mobile generator as claimed in claim 14, wherein the cylindrical member comprises at least one opening for the latching member.

16. The modular solar mobile generator as claimed in claim 4, wherein the locking member is shaped for allowing rotation of the latching member about an axis parallel to a longitudinal to the locking member while remaining secured to the latching member.

17. The modular solar mobile generator as claimed in claim 4, wherein the locking member is shaped for allowing rotation of the latching member about an axis perpendicular to a longitudinal axis along the locking member while remaining secured to the latching member.

18. The modular solar mobile generator as claimed in claim 1, the attachment of the base section to the lower end of the extendable longitudinal support arm being the pivoting mechanism.

19. The modular solar mobile generator as claimed in claim 1, the attachment of the upper end of the extendable longitudinal support arm to the solar energy generating component being the pivoting mechanism.

20. The modular solar mobile generator as claimed in claim 1, the attachment of the base section to the lower end of the extendable longitudinal support arm being a first pivoting mechanism and the attachment of the upper end of the extendable longitudinal support arm to the solar energy generating component being a second pivoting mechanism.

* * * * *